Patented Apr. 21, 1936

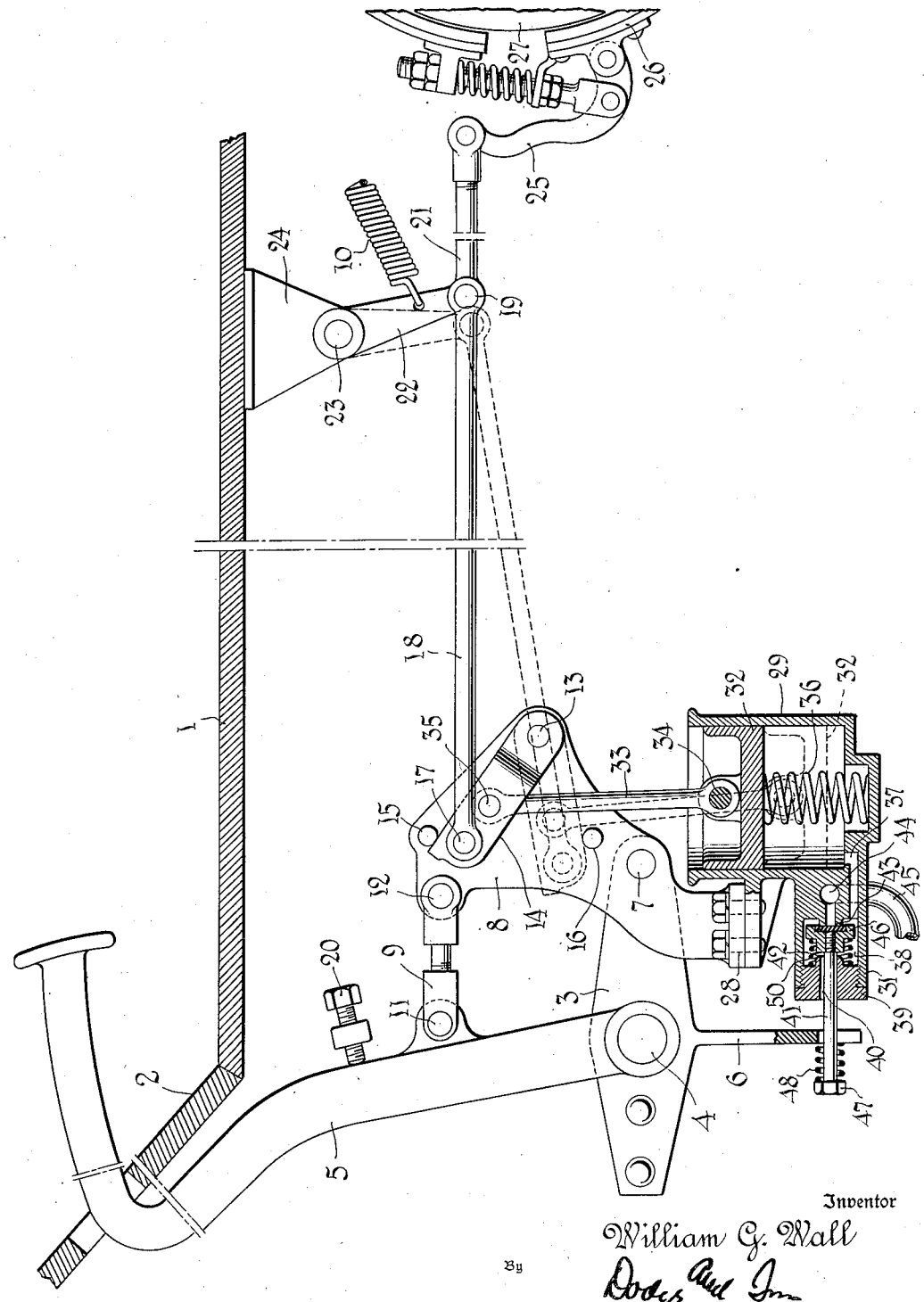

2,037,868

UNITED STATES PATENT OFFICE 2,037,868

VEHICLE BRAKE

William G. Wall, Indianapolis, Ind., assignor to The New York Air Brake Company, a corporation of New Jersey Application May 5, 1932, Serial No. 609,525

8 Claims. (Cl. 188—196)

This invention relates to devices for temporarily increasing the force ratio of leverage devices and incidentally taking up slack therein to permit the actuator to operate at the increased force ratio without excessive travel. The invention will be described as applied to pedal actuated brakes for automobile vehicles, but it is not limited to that field.

This application is subordinate to a companion application Serial No. 609,524 filed May 5, 1932 and is more or less specifically directed to the embodiment herein illustrated in which the ratio adjusting member is mounted on a swinging lever, and is actuated by a motor preferably also mounted on such lever. Generic claims are presented in the companion application.

In all braking devices considerable slack travel of the brake pedal is necessary to insure a complete release of the brake. The necessity for considerable slack travel, limits the practicable force multiplication from the actuator to the brake, for the travel of the actuator is limited, and the greater the force multiplication, the greater the actuator travel must be. Even in the heaviest automotive vehicles, it would be practicable to dispense with power actuated brakes if a way be found to shorten the slack travel of the actuator or brake pedal and thus permit the use of higher leverage ratios. There is decided advantage in doing so, for an application produced directly by pressure exerted by the operator, can be more smoothly graduated on and off than can any valve controlled application, and such application is not subject to accidental failures.

The general operative principle underlying this and the companion application is the use of motor means, rendered operative by the initial motion of an operator-operated member from its normal (brake released) position, to increase the force ratio between such member and the operated device (brakes). In most cases the increase of such ratio is impracticable unless some means be provided to reduce the slack, and the present invention contemplates the taking up of the slack as nearly completely as is practicable, concurrently with the increase in force ratio.

It is characteristic of the invention that if the motor means above mentioned should fail to function, the brakes can be applied through the operator-operated member with the normal (relatively low) force ratio, and with normal slack travel.

The preferred embodiments of the invention include a reversible motor and motor reversing control means responsive to initial motion of the operator-operated member, to shift the ratio multiplying mechanism before the brakes apply (i e., before braking stress is developed). Some self locking mechanism, such as a toggle, is preferably associated with the ratio changing mechanism to protect the motor from braking stresses. This makes possible the use of a small motor. The motor has no brake applying function, and hence need merely be powerful enough to shift the ratio changing mechanism.

While it is desirable that the slack should be completely taken up before the brakes apply, it must be understood that this is a relative term. Under absolutely ideal conditions, the slack take-up would remove all the slack and bring the brakes just to that point at which they commence to drag. At such time the braking effect would be negligible, but the heating effect would be serious if the brakes were allowed to remain in this condition for a substantial period. The device will function, however, in a useful degree if it takes up somewhat less or a little more than the ideal amount of slack, and the phrase "to take up the slack" is descriptive rather than limiting.

Various reversible motors might be used to operate the slack take-up mechanism. A satisfactory motor comprises a single acting movable abutment with a return spring which, in effect, is a reversible motor. Since such a movable abutment operates by the difference of pressures on its opposite sides, a so-called vacuum motor and a pressure motor are approximate equivalents. For this particular service it is convenient to use a vacuum cylinder which is connected by a valve selectively with atmosphere or with the intake manifold of the internal combustion engine customarily used to propel motor vehicles.

The structure disclosed in the present application differs from that of the related application chiefly in that the device is wholly self-contained.

A preferred embodiment of the invention is illustrated in the accompanying drawing, which shows partly in side elevation and partly in section a portion of one brake, an operator-operated member (brake pedal) and the connecting linkage to which the slack take-up mechanism is applied. In this view only one brake is shown, but it will be understood that it is customary in the art to operate several brakes simultaneously, and that the invention may be so applied by conventional means. The details of construction of the brake proper are immaterial.

In the drawing, I represents diagrammatically the flooring of a motor vehicle, and 2 the foot board. 3 is a bracket supported on a portion of the framing of the vehicle, not shown. 4 is the fulcrum on which the foot pedal 5 is pivoted, and 6 is a downward extension of the bracket 3, the function of which will be described in detail hereinafter. 10 is a spring which draws the brake rigging in a brake releasing direction, and 20 is an adjustable stop for limiting the releasing movement of the pedal.

Pivoted at 7 on the bracket 3 is a secondary rock lever 8 which is operatively connected to the pedal 5 by means of a link 9 pivoted at 11 to the foot pedal 5 and at 12 to the secondary lever 8. The link 9 is indicated as including threaded means for adjusting its length. The lever 8 is in effect an operator-operated member. Pivoted at 13 on the lever 8 is a toggle lever or arm 14 which swings between two stops 15 and 16. Pivoted at 17 to the lever 14 is a brake rod 18 which is pinned at 19 to another brake rod 21 and to a guiding link 22 pivoted at 23 on the bracket 24. The link 21 is connected to the brake arm 25. The arm 25 actuates the brake 26, and when turned counterclockwise, as viewed in the figure, applies the brake. As stated, it is immaterial how many such brakes are simultaneously actuated or how they are connected to the brake rod 21, or what their construction is, though I contemplate the use of types customarily used on automotive vehicles. The rod 18 may be regarded as typical of means through which a force reaction is exerted upon some operated device.

The stops 15 and 16 are so located relatively to the pivots 7 and 13, and the path of the pivot 19, that pull of the brake rod 18 will urge the lever 14 against the stop 15 or 16, whichever it at that time engages. This merely amounts to saying that the lever 14, together with the brake rod 18, produces a toggle which passes its straightened position in moving from one to the other of its limiting positions.

Bolted to the lower end of the secondary lever 8, at 28, is a cylinder 29 having an extension 31 which serves as a valve housing. The cylinder 29 is open at its upper end and working in the cylinder is a trunk piston 32. The piston rod 33 is pivoted at 34 to the piston and is pivoted at 35 to the lever 14. A spring 36 housed in the cylinder, and reacting against the piston 32, urges the piston upward and consequently tends to shift the link 14 into contact with the stop 15.

If the space below the piston 32 be partially evacuated the predominance of atmospheric pressure will overpower the spring 36 and the piston 32 will move inward until the toggle lever 14 engages the stop 16. The arc in which the piston 17 travels is such that when the toggle lever 14 is moved as described, the pivot 19 will be drawn to the dotted line position, taking up most or all of the slack in the force transmitting mechanism (brake rigging). Simultaneously the effective length of the lever arm between the fulcrum 7 of the lever 8 and the pivot 17, which is the effective point of connection between the lever 8 and the brake rod 18, is greatly reduced (in the example illustrated it is reduced to less than one-half of its normal value).

There is a passage 37 which leads from the cylinder 29 to a valve chamber 38 in the extension 31. The outer end of the extension 31 is closed by a threaded plug 39 in which is slidably guided a valve stem 41. The stem 41 makes free fit and the guideway is formed with a groove 40 to permit air flow. Surrounding the guideway is a valve seat 42. Opposed to this valve seat is a second valve seat 43 which controls a passage 44. The passage 44 is connected by a flexible hose 45 with any space maintained at sub-atmospheric pressure, for example, the intake manifold of a gasoline engine operating on the Otto cycle.

Mounted on the stem 41 is a valve 46, which, in the inner position of stem 41, closes against seat 43 and opens a passage past the seat 42 and through groove 40 to atmosphere. Under such conditions the space below piston 32 is at atmospheric pressure so that the piston is moved to its uppermost position by spring 36. If the stem 41 is drawn outward (to the left in the drawing) the valve 46 seals against seat 42, closing the atmospheric connection and opening the sub-atmospheric connection 44 through the seat 43 and port 44. The resulting drop in pressure in the cylinder 29 causes piston 32 to move downward against the resistance of spring 36. This motion continues until it is arrested by collision of lever 14 with stop 16.

Since the port 44 is at sub-atmospheric pressure, the valve 46 will tend to close against the seat 43. This tendency is assisted by a light spring 50 which urges the valve 46 to its normal or inner position.

The stem 41 passes through a slot in the extension 6 and terminates in a head or enlargement 47, between which and the bracket 6 is a coiled compression spring 48 stiff enough to overpower spring 50 and the differential pressure urging valve 46 inward. In the position shown in the drawing, in which foot pedal 5 is in its full release position, the spring 48 is not under stress, and the valve 46 seals against the port 43. There is, however, little or no clearance between the spring 48 and the head 47 and bracket 6, so that upon a very slight depression of the foot pedal 5 the valve 46 will be shifted against seat 42 by the rocking of the lever 8. The shifting of the valve 46 causes the piston 32 to move downward and move the parts to the dotted line position in which the slack travel has been taken up and the leverage ratio from the pedal 5 to the arm 25 has been increased. (In the example illustrated it is somewhat more than doubled.) It follows that a very slight depression of the brake pedal 5 takes the slack out of the brake rigging and establishes an increased leverage ratio so that the brakes may be applied with great force by relatively light pressure exerted on the pedal.

As the pedal arrives in its brake releasing position, the valve 46 will be shifted back cutting off the sub-atmospheric connection to the cylinder, and establishing an atmospheric connection so that the piston 32 will move upward to release the slack and restore the normal (lower) leverage ratio.

It will be observed that the parts are so arranged that failure of the motor leaves the system in a condition in which the normal leverage and normal slack exist, so that the brakes do not drag and may be applied with the same effectiveness that conventional foot brakes can now be applied.

While I prefer to take up substantially all the slack by the action of the motor, and thus bring the brake to the point of application, the invention is not limited in this regard.

While the invention is illustrated as applied to brakes of a strictly mechanical type, other types in which there is a definite force and motion relation between the brake pedal and the brake, are known. The invention is applicable to other than purely mechanical systems, and the claims are drawn in broad enough scope to read on such applications.

In certain of the claims the term "force ratio" is used to express the ratio of the force exerted at the brake to the force exerted on the actuator or pedal, and the term is used for the express purpose of avoiding such implied limitations as might ensue from the adoption of phrases like "leverage ratio".

While I prefer a toggle as the simplest self-locking mechanism known to me, and available for use in this mechanism, to relieve the motor of the stress exerted during braking, various other self-locking mechanisms are known, and may be substituted for the toggle within the broad scope of the invention.

What is claimed is,—

1. The combination of a brake; a lever; a link connected with the brake; a member shiftable on the lever and pivoted to the link, said member being shiftable in a direction to increase the force ratio while reducing the slack between the lever and brake; a motor mounted on said lever and connected to shift said member back and forth; and a controller mounted on said lever, controlling said motor and actuated by movements of said lever.

2. The combination of an operator-operated member; force transmitting means through which said member may react upon an operated device with a normal force ratio; shiftable means for changing said force ratio; reversible power means for shifting said shiftable means, said power means being carried by a movable element of said force transmitting means; and a reversing controller supported by and controlling said power means and reacting against a fixed support.

3. The combination of an operator-operated member; force transmitting means through which said member may react upon an operated device with a normal force ratio; shiftable means mounted on said member for changing said force ratio; reversible power means mounted on said member and arranged to shift said shiftable means; and a reversing controller for said means arranged to be actuated by motion power means arranged to be actuated by motion of said member through a limited range while said force transmitting means is substantially free of stress.

4. The combination of an operator-operated member; force transmitting means through which said member may react upon an operated device with a normal force ratio; shiftable means mounted on said member for changing said force ratio; a reversible expansible chamber motor mounted on said member and arranged to shift said shiftable means; and a reversing valve for said motor arranged to be actuated by motion of said member through a limited range while said force transmitting means is substantially free of stress.

5. The combination of an operator-operated member; force transmitting means through which said member may react upon an operated device with a normal force ratio and with slack travel; shiftable means mounted on said member for increasing said force ratio, said means being guided in a path such that its motion to increase said ratio also reduces said slack travel; a reversible expansible chamber motor mounted on said member and arranged to shift said shiftable means; and a reversing valve for said motor arranged to be actuated by motion of said member through a limited range while said force transmitting means is substantially free of stress.

6. The combination of an operator-operated member; force transmitting means through which said member may react upon an operated device with a normal force ratio, said means including a fulcrum shiftable on said member to change said force ratio; a reversible motor mounted on said member and arranged to shift said fulcrum between limiting positions; and a reversing controller for said motor arranged to be actuated by motion of said member through a limited range while said force transmitting means is substantially free of stress.

7. The combination of an operator-operated member; force transmitting means through which said member may react upon an operated device with a normal force ratio, said means including a fulcrum shiftable on said member to change said force ratio; a reversible motor mounted on said member and arranged to shift said fulcrum between limiting positions; a reversing controller for said motor arranged to be actuated by motion of said member through a limited range while said force transmitting means is substantially free of stress; and means rendered effective by stress in said force transmitting means to retain said fulcrum in whichever limiting position it occupies when such stress is applied.

8. The combination of an operator-operated member; a link pivoted thereto; means limiting the swinging motion thereof; a force transmitting member pivoted to said link and forming with the link a self locking toggle; a reversible motor mounted on said member and arranged to shift said link between its limiting positions; and a reversing controller for said motor arranged to be actuated by motion of said member through a limited range while said force transmitting member is unstressed.

WILLIAM G. WALL.